United States Patent [19]

Monceaux et al.

[11] Patent Number: 5,622,680
[45] Date of Patent: Apr. 22, 1997

[54] POST-COMBUSTION CATALYSTS

[75] Inventors: Laurence Monceaux, Choisy-au-Bac; Pierre Courtine, Compiegne; Hua Xian, Compiegne; Wuryaningsih Sri Rahayu, Compiegne, all of France

[73] Assignee: Specialites et Techniques en Traitement de Surfaces-STTS, Fleury, France

[21] Appl. No.: 438,873

[22] Filed: May 10, 1995

Related U.S. Application Data

[63] Continuation of Ser. No. 188,744, Jan. 31, 1994, abandoned, which is a continuation of Ser. No. 965,280, Jan. 25, 1993, abandoned.

[30] Foreign Application Priority Data

Jul. 25, 1990 [FR] France .................................... 90 09502

[51] Int. Cl.$^6$ ........................................................ B01J 8/02
[52] U.S. Cl. ..................... 423/213.5; 423/213.2; 502/303; 502/525; 502/324; 502/328
[58] Field of Search .................. 423/212, 213.2, 423/213.5, 239.1; 502/300, 301, 302, 525, 303, 324, 328

[56] References Cited

U.S. PATENT DOCUMENTS

| | | | |
|---|---|---|---|
| 3,884,837 | 5/1975 | Remeika et al. | 423/213.2 |
| 4,029,738 | 6/1977 | Courty et al. | 423/213.5 |
| 4,049,583 | 9/1977 | Lauder | 423/213.5 |
| 4,134,852 | 1/1979 | Volin | 423/213.5 |
| 4,820,678 | 4/1989 | Xu | 502/303 |
| 4,921,829 | 5/1990 | Ozawa et al. | 423/213.5 |
| 4,959,339 | 9/1990 | Arai | 502/302 |
| 4,998,876 | 3/1991 | Farrar | 431/4 |

FOREIGN PATENT DOCUMENTS

WO89/05186  6/1989  WIPO.

Primary Examiner—Gary P. Straub
Attorney, Agent, or Firm—Jacobson, Price, Holman & Stern, PLLC

[57] ABSTRACT

The invention relates to catalysts for the treatment of combustion gases. The catalysts include an active phase of the perovskite having the general formula: $L_xL'_{1-x}M_yM'_z\phi_{1-y-z}O_3$, wherein L is an element selected from lanthanides and rare earths, L' is an element selected from a group consisting of Sr, Ca, Ba, Ce, K, Bi, Rb or Na; M is a transition metal selected from a group consisting of Cr, Mn, Fe, Co, Ni and Cu; M' is at least one metal selected from a group consisting of Pt, Ru, Pd, Rh; $\phi$ is a cationic lacuna; $0<x<0.5$, $0.85<y\leq1$, $0\leq z<0.08$ with $0.85<y+z\leq1$. The catalysts of the invention are particularly useful for purifying exhaust gas from diesel engines, particularly for the removal of soot.

8 Claims, No Drawings

POST-COMBUSTION CATALYSTS

This application is a continuation of application Ser. No. 08/188,744, filed Jan. 31, 1994, abandoned, which is a continuation of application Ser. No. 07/965,280, filed Jan. 25, 1993, abandoned.

The present invention concerns post-combustion catalysts for the treatment of combustion gases.

The catalysts used to clean exhaust gases can be classified into two categories:

total oxidation catalysts which convert carbon monoxide into carbon dioxide and hydrocarbons into carbon dioxide and water vapor;

three-way catalysts which oxidize carbon monoxide and hydrocarbons and reduce oxides of nitrogen to nitrogen.

The catalysts currently employed to treat exhaust gases are in the form of precious metals dispersed as finely as possible on a stabilized alumina layer which has a large specific surface area and which covers a cordierite honeycomb. These catalysts give good performance when new but age badly due to sintering of the precious metals and conversion of the alumina.

Solid solutions are formed, or the metals segregate inside or outside the grains, or there is a gradient in the concentration of one of the metals from the core of the grain towards the periphery, depending on the mode of preparation. These phenomena are difficult to control in the context of industrial manufacture.

All these phenomena cause a reduction in specific surface area and activity. Moreover, this type of catalyst contains non-negligible quantities of high-cost precious metals.

An objective of the present invention is to remedy these drawbacks.

An object of the present invention is a family of post-combustion catalysts.

Another object of the invention is the use of these catalysts for diesel engine exhaust gas treatment.

Another object of the invention is the use of these catalysts for gasoline engine exhaust gas treatment.

A final object of the invention is a method of preparing catalysts in accordance with the invention.

The present invention consists in catalysts for the treatment of combustion gases including an active phase of the perovskite type having the general formula:

$$L_xL'_{1-x}M_yM'_z\phi_{1-y-z}O_3 \qquad (I)$$

in which:

L represents an element selected from the lanthanides and the rare earths,

L' represents an element selected from Sr, Ca, Ba, Ce, K, Bi, Rb and Na,

M represents a transition metal selected from Cr, Mn, Fe, Co, Ni and Cu,

M' represents at least one metal selected from Pt, Ru, Pd, Rh, $\phi$ represents a cation lacuna, $0 \leq 1-x < 0.5$, $0.85 < y \leq 1$, $0 \leq z < 0.08$, $0.85 < y+z \leq 1$ For the catalysts of the invention, L preferably represents an element selected from La, Y, Nd and Pr.

Preferably, L' represents Sr, L represents La or Nd and M is advantageously Mn or Co.

The catalysts in accordance with the invention can be used to treat combustion gases from various sources. For example, they can be used to treat the combustion gases from oil-fired boilers or internal combustion engines.

The catalysts in accordance with the invention having formula (I) are particularly effective for cleaning the exhaust gases from diesel engines, and in particular for eliminating soot. The curves obtained by thermogravimetric and differential thermal analysis show that, in the case of soot, only the DTA curve is made up of successive signals which tend to prove that combustion is imperfect and sporadic whereas in the case of soot in contact with the catalyst there is a single signal of great amplitude proving much better combustion and therefore an undoubted catalytic effect. The use of catalysts in accordance with the invention further makes it possible significantly to reduce the soot ignition temperature and the difference between the ignition and end of combustion temperatures.

The catalysts in accordance with the invention are effective for the treatment of gases in the exhaust gases whether these are gases (carbon oxide, hydrocarbons or oxides of nitrogen) constituting the exhaust gases proper of internal combustion engines or oxides of carbon resulting from the combustion of soot.

In this case use is preferably made of a catalyst in accordance with the invention including simultaneously at least one noble metal and a cation lacuna. This type of catalyst has formula (I) in which $0 < z < 0.01$ and $0.85 < y+z < 1$.

The presence of the cation lacuna results in oxygen atoms which are weakly bonded to the surface and consequently the phenomenon of oxidation and then reduction of the catalyst surface, necessary in the case of gas oxidation and reduction reactions, is greatly facilitated.

The catalysts in accordance with the invention are thermally stable, even in a slightly reducing atmosphere such as that of automobile exhaust gases.

The substitution of a small quantity of platinum for manganese or cobalt makes it possible to prevent sulfur poisoning and to increase the activity of the catalyst in terms of oxidation of CO and hydrocarbons. The platinum is not supported but enclosed in the matrix in the $Pt^{4+}$ form and is homogeneous by virtue of the preparation method employed. Consequently, there is no risk of it being converted into a volatile oxide or of its activity diminishing because of sintering as in the case of metals supported on alumina.

The substitution of ruthenium for manganese or cobalt produces a three-way catalyst which eliminates oxides of nitrogen in addition to CO and hydrocarbons. Being inside the perovskite matrix, like the platinum, the ruthenium cannot be lost in the form of volatile oxide.

The perovskite active phases can be synthesized in various ways. Sol-gel synthesis is particularly preferred.

In a first method the rare earths, alkaline-earths and transition metals other than the precious metals are introduced in the form of nitrates in the required proportions (stoichiometric or otherwise) and then dissolved and mixed carefully in an aqueous solution of citric acid. The precious metals (Pt and Ru) are introduced in the form of hexachloroplatinic acid or ruthenium chloride. Evaporation of this solution at 70° C. in vacuum in a rotary evaporator causes a gel to form. The gel is then calcined at 450° C., the temperature being increased slowly (5° C./h) to avoid localized overheating due to the fact that the formation of the oxide is strongly exothermic. The solid product obtained is then ground and calcined again in air at 600° C. for six hours to achieve good crystallization and to eliminate the remaining organic substances.

In a second method the rare earths, alkaline earths and transition metals other than the precious metals are introduced in the form of nitrates in the required proportions (stoichiometric or otherwise) in a solution of citric acid dissolved in ethylene glycol. The precious metals are introduced in the form of hexachloroplatinic acid and ruthenium chloride. After homogenization, the mixture is heated to a temperature in the order of 250° C. to eliminate a large part of the nitrates and organic compounds. The solid product obtained is then calcined a first time at 450° C. and then at 600° C. for six hours.

The temperature of the second roasting is critical in both methods. If it is below 600° C. the required substance is not formed. If it is above 600° C. some sintering occurs and the specific surface area of the substance is reduced, leading to a reduction in the performance of the catalyst.

The use of these methods makes it possible to obtain higher specific surface areas than with oxide or acetate mixture type methods.

The catalyst may be used in extruded form or deposited onto a honeycomb made from a refractory material such as cordierite. One impregnation method producing a highly homogeneous deposit in the order of 20 to 30 μm thick entails, after synthesizing the active phase, forming a sludge by grinding in the wet phase in a planetary grinder for 12 hours. The support is then immersed in the suspension and then drained. A flow of compressed air prevents clogging of the passages. The impregnated support is then calcined at a temperature in the order of 600° C. The final catalyst is obtained after a single impregnation stage, unlike catalysts consisting of precious metals deposited on alumina which require an impregnation stage for each component.

The present invention is distinguished by the fact that the catalysts contain very little precious metals or even none at all, which is highly advantageous given the depletion of platinum mines and the cost of precious metals.

The present invention is described in more detail with the assistance of the following illustrative examples.

Examples 1 through 3 show the effect of catalysts in accordance with the invention on gasoline engine exhaust gases. The tests were conducted under the following conditions:

the catalyst is in extruded form 2 mm in diameter by 2 mm long,

- the gas has the following composition:  
  $H_2O = 10\%$  
  $CO_2 = 13\%$  
  $CO = 1.25\%$  
  $C_3H_8 = 400$ ppm  
  $NO = 2\,000$ ppm  
  $O_2 = 0.75\%$  
  $N_2 = 74.76\%$ VVH=100 000 hr$^{-1}$

EXAMPLE 1

This example shows the performance of oxidation catalysts having the general formula:

$La_{0.8}Sr_{0.2}Mn_yPt_z\phi_{1-y-z}O_3$

The catalysts were prepared using the second method cited previously. Table I gives the values of the temperatures required to convert 50% and 98% of the CO and the hydrocarbons (HC) present in the gas. By way of comparison the performance of a catalyst consisting of platinum on alumina spheres (0.3% by mass) is also given.

TABLE I

| Catalyst | $C_{CO50\%}$ | $C_{CO98\%}$ | $C_{HC50\%}$ | $C_{HC98\%}$ |
|---|---|---|---|---|
| 1′ Pt/Al$_2$O$_3$ | 350° C. | >550° C. | 368° C. | 445° C. |
| 2 La$_{0.8}$Sr$_{0.2}$MnO$_3$ | 400° C. | >550° C. | 365° C. | 400° C. |
| 3 La$_{0.8}$Sr$_{0.2}$Mn$_{0.9}\phi_{0.1}$O$_3$ | 365° C. | >550° C. | 350° C. | 405° C. |
| 4 La$_{0.8}$Sr$_{0.2}$Mn$_{0.999}$Pt$_{0.001}$O$_3$ | 332° C. | 450° C. | 345° C. | 371° C. |
| 5 La$_{0.8}$Sr$_{0.2}$Mn$_{0.9}$Pt$_{0.008}\phi_{0.092}$O$_3$ | 335° C. | 371° C. | 329° C. | 361° C. |

These results show that better results are obtained with an active phase comprising simultaneously a cation lacuna and a noble metal partially substituting the manganese.

EXAMPLE 2

This example shows the action of ruthenium associated with an M cation substitution lacuna in respect of the reduction of NO$_x$ and the action of ruthenium associated with platinum or palladium and a lacuna to produce a three-way catalyst.

Table II gives the composition of the catalysts tested.

TABLE II

| Catalyst | Composition |
|---|---|
| 2 | La$_{0.8}$Sr$_{0.2}$MnO$_3$ |
| 6 | La$_{0.8}$Sr$_{0.2}$Mn$_{0.9}$Ru$_{0.1}$O$_3$ |
| 7 | La$_{0.8}$Sr$_{0.2}$Mn$_{0.9}\phi_{0.1}$O$_3$ |
| 8 | La$_{0.8}$Sr$_{0.2}$Mn$_{0.9}$Ru$_{0.01}\phi_{0.09}$O$_3$ |
| 9 | La$_{0.8}$Sr$_{0.2}$Mn$_{0.9}$Ru$_{0.01}$Pt$_{0.008}\phi_{0.082}$O$_3$ |
| 10 | La$_{0.8}$Sr$_{0.2}$Mn$_{0.9}$Ru$_{0.01}$Pd$_{0.01}\phi_{0.08}$O$_3$ |
| 11 | La$_{0.8}$Sr$_{0.2}$Mn$_{0.9}$Pt$_{0.008}$Rh$_{0.008}\phi_{0.084}$O$_3$ |

Table III summarizes the results obtained with the various catalysts.

TABLE III

| Catalyst | $C_{CO98\%}$ | $C_{HC98\%}$ | $C_{NO50\%}$ |
|---|---|---|---|
| 2 | >550° C. | 400° C. | — |
| 6 | 500° C. | 412° C. | 412° C. |
| 7 | >550° C. | 405° C. | 520° C. |
| 8 | 480° C. | 400° C. | 350° C. |
| 9 | 360° C. | 360° C. | 360° C. |
| 10 | 370° C. | 350° C. | 345° C. |
| 11 | 470° C. | 430° C. | 365° C. |

It is evident that the introduction of ruthenium into the matrix enables reduction of NO$_x$ and the simultaneous substitution of ruthenium and platinum and a cation lacuna or ruthenium and palladium or rhodium and platinum and a cation lacuna enables a three-way catalyst to be obtained.

The results for catalysts 7 and 9 show that the catalyst including very small quantities of the metal from the platinum group associated with a cation lacuna at site B of the platinum group has better performance than that having no lacuna.

EXAMPLE 3

This example shows the starting temperatures for a few catalysts.

TABLE IV

| Catalyst | CO | Hc | NO |
|---|---|---|---|
| $Pt/Al_2O_3$ | 200° C. | 200° C. | — |
| $La_{0.8}Sr_{0.2}Mn_{0.9}Pt_{0.008}\phi_{0.092}O_3$ | 150° C. | 150° C. | — |
| $La_{0.8}Sr_{0.2}Mn_{0.9}Pt_{0.008}\phi_{0.092}O_3$* | 150° C. | 200° C. | — |
| $La_{0.8}Sr_{0.2}Mn_{0.99}Pt_{0.01}O_3$ | 183° C. | 183° C. | — |
| $La_{0.8}Sr_{0.2}Mn_{0.99}Pt_{0.01}O_3$* | 312° C. | 232° C. | — |
| $La_{0.8}Sr_{0.2}Mn_{0.9}Ru_{0.01}Pt_{0.008}\phi_{0.082}O_3$ | 150° C. | 150° C. | — |
| $La_{0.8}Sr_{0.2}Mn_{0.9}Ru_{0.01}Pt_{0.008}\phi_{0.082}O_3$* | 160° C. | 200° C. | — |
| $La_{0.08}Sr_{0.2}Mn_{0.9}Ru_{0.01}Pd_{0.01}\phi_{0.08}O_3$ | 140° C. | 135° C. | — |
| $La_{0.08}Sr_{0.2}Mn_{0.9}Ru_{0.01}Pd_{0.01}\phi_{0.08}O_3$* | 150° C. | 170° C. | — |
| $La_{0.8}Sr_{0.2}Mn_{0.9}Pt_{0.008}Rh_{0.008}\phi_{0.084}$ | 130° C. | 230° C. | 230° C. |
| $La_{0.8}Sr_{0.2}Mn_{0.998}Pt_{0.001}Rh_{0.0001}O_3$ | 180° C. | 210° C. | 200° C. |

It seems that the starting temperatures are in the same order of magnitude or better than those obtained with a supported metal type catalyst, whether the catalyst is aged thermally or not.

The best results with respect to the starting temperatures of CO and hydrocarbon oxidation reactions are obtained with catalysts containing both noble metals and cation lacunae.

EXAMPLE 4

Combustion of Soot

Measurements were carried out on synthetic soot containing 70% by weight carbon black, 15% gas oil and 15% engine oil. Differential thermal analysis (DTA) on the soot only and on the soot intimately mixed with the catalyst under test (in a soot/catalyst ratio of 15% by weight) were carried out. Analysis of the curves obtained shows the existence of two combustion peaks.

The table below gives the temperatures $T_1$ and $T_2$ respectively corresponding to the summit of the first and second combustion peaks and the end of combustion temperature $T_3$.

| | $T_1$ | $T_2$ | $T_3$ |
|---|---|---|---|
| without catalyst | 350 | 670 | 720 |
| $La_{0.8}Sr_{0.2}MnO_3$ | 375 | 480 | 660 |
| $La_{0.8}Sr_{0.2}Mn_{0.91}\phi_{0.09}O_3$ | 275 | 460 | 580 |

The table shows that the catalyst with no precious metals is more active if the molecule has a cation lacuna at site B.

EXAMPLE 5

| | $T_1$ | $T_2$ | $T_3$ |
|---|---|---|---|
| without catalyst | 350 | 670 | 720 |
| $La_{0.8}Sr_{0.12}Mn_{0.999}Pd_{0.001}O_3$ 900° C. | 325 | 540 | 660 |
| $La_{0.8}Sr_{0.12}Mn_{0.999}Pd_{0.001}O_3$ 600° C. | 260 | 450 | 575 |
| $La_{0.8}Sr_{0.12}Mn_{0.9}Pd_{0.008}\phi_{0.092}O_3$ 900° C. | 308 | 525 | 675 |
| $La_{0.8}Sr_{0.12}Mn_{0.9}Pd_{0.008}\phi_{0.092}O_3$ 600° C. | 290 | 490 | 660 |

The catalysts with lacunae are more active if the precious metals are present in very small quantities, The table shows that the catalyst with no precious metals is more active if the molecule has a cation lacuna at site B.

EXAMPLE 5

| | $T_1$ | $T_2$ | $T_3$ |
|---|---|---|---|
| without catalyst | | 350 | 670 | 720 |
| $La_{0.8}Sr_{0.2}Mn_{0.999}Pd_{0.001}O_3$ 900° C. | 325 | 540 | 660 |
| $La_{0.8}Sr_{0.2}Mn_{0.999}Pd_{0.001}O_3$ 600° C. | 260 | 450 | 575 |
| $La_{0.8}Sr_{0.2}Mn_{0.9}Pd_{0.008}\phi_{0.092}O_3$ 900° C. | 308 | 525 | 675 |
| $La_{0.8}Sr_{0.2}Mn_{0.9}Pd_{0.008}\phi_{0.092}O_3$ 600° C. | 290 | 490 | 660 |

The catalysts with lacunae are more active if the precious metals are present in very small quantities, preferably below 1%. The results show also that the catalysts calcined at 600° C. perform better than those calcined at 900° C.

EXAMPLE 6

| | $T_1$ | $T_2$ | $T_3$ |
|---|---|---|---|
| without catalyst | 350 | 670 | 720 |
| $La_{0.8}Sr_{0.2}Mn_{0.999}Pd_{0.001}O_3$ | 260 | 450 | 475 |
| $La_{0.08}Sr_{0.2}Mn_{0.9}Ru_{0.1}O_3$ | 305 | 490 | 610 |
| $La_{0.8}Sr_{0.2}Mn_{0.999}Pt_{0.001}O_3$ | 295 | 485 | 660 |

The results show that the catalyst with palladium substituted for metal atoms at site B is more active than those substituted with ruthenium or platinum.

We claim:

1. A method for treating exhaust gases containing soot from diesel engines to substantially eliminate the soot, comprising contacting the exhaust gases with a catalyst including a perovskite active phase having the formula:

$$La_{0.8}Sr_{0.2}Mn_yM'_z\phi_{1-y-z}O_3$$

in which

M' represents at least one metal selected from the group consisting of Pt, Ru, Pd and Rh;

$\phi$ represents a cation lacuna; and $0.85<y\leq 1$, $0\leq z<0.08$, and $0.85<y+z\leq 1$.

2. The method according to claim 1, wherein said catalyst is a member selected from the group consisting of:

$$La_{0.8}Sr_{0.2}Mn_{0.999}Pd_{0.001}O_3 \text{ and}$$

$$La_{0.8}Sr_{0.2}Mn_{0.91}\phi_{0.09}O_3.$$

3. The method according to claim 1, wherein the catalyst is in extruded form.

4. The method according to claim 1, wherein the catalyst is deposited on a support.

5. The method according to claim 4, wherein the support is a honeycomb made from a refractory material or metal.

6. The method according to claim 1, wherein M' represents Pt or Pd.

7. The method according to claim 1, wherein M' represents Ru or Rh.

8. The method according to claim 1, wherein $0<z\leq 0.01$, $y+z<1$ and $0.85<y<1$.

* * * * *

UNITED STATES PATENT AND TRADEMARK OFFICE
CERTIFICATE OF CORRECTION

PATENT NO. : 5,622,680
DATED : April 22, 1997
INVENTOR(S) : Laurence Monceaux et al.

It is certified that error appears in the above-indentified patent and that said Letters Patent is hereby corrected as shown below:

Title page, item [30] Piority Data PCT    PCT/FR91/00609    07/24/91

Signed and Sealed this

Eighteenth Day of November 1997

*Attest:*

BRUCE LEHMAN

*Attesting Officer*    *Commissioner of Patents and Trademarks*